(No Model.)  C. P. SHUFELT.  3 Sheets—Sheet 1.
GRAIN BINDER.

No. 265,159.  Patented Sept. 26, 1882.

Witnesses
W. C. Coilies
Jno. C. MacGregor

Inventor
Calvin P. Shufelt
By Coburn & Thacher
Attorneys (No Model.)  3 Sheets—Sheet 2.
C. P. SHUFELT.
GRAIN BINDER.
No. 265,159.  Patented Sept. 26, 1882.
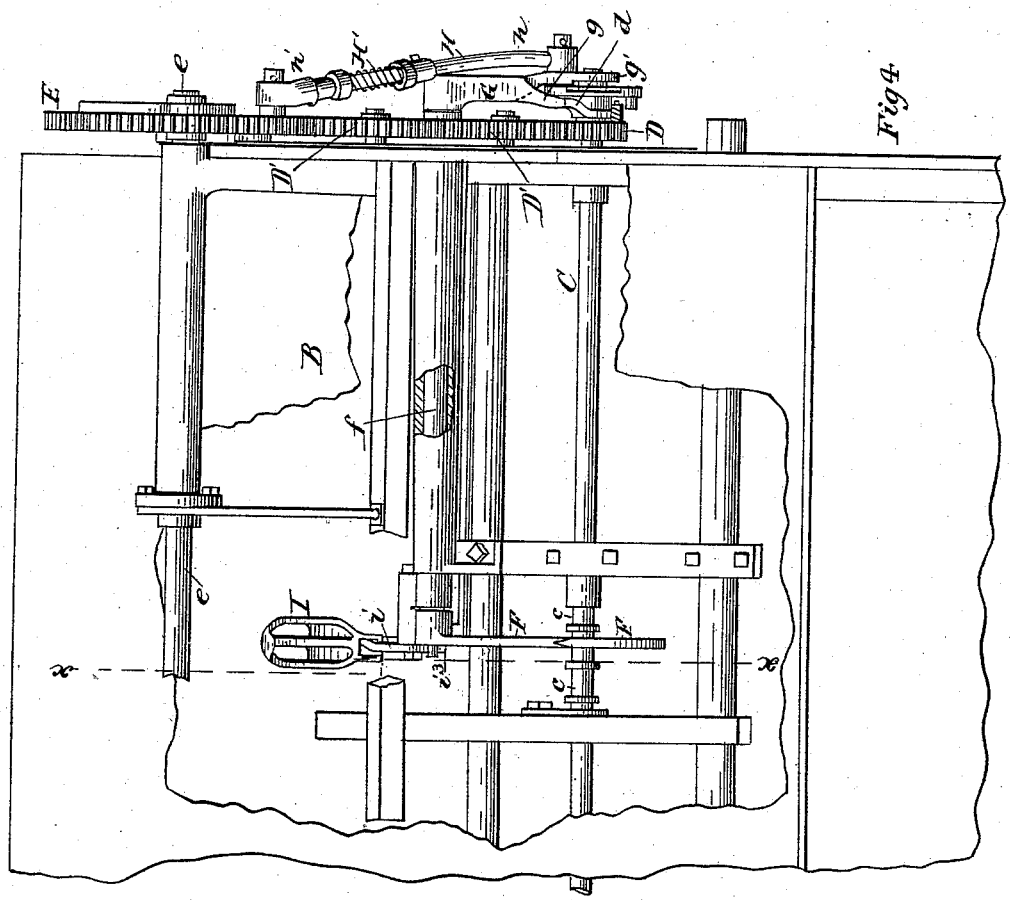
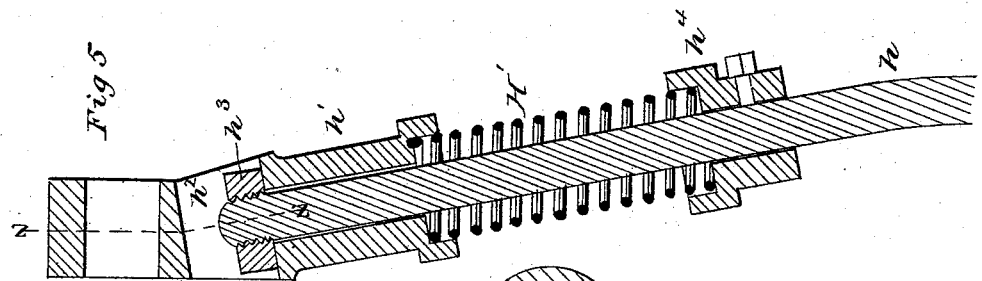
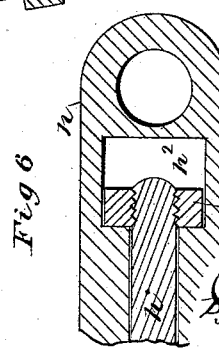
Witnesses
W. C. Corlies
Jno. C. MacGregor
Inventor
Calvin P. Shufelt
by Burritt Thacher
Attorneys (No Model.)  3 Sheets—Sheet 3.

C. P. SHUFELT.
GRAIN BINDER.

No. 265,159. Patented Sept. 26, 1882.

Witnesses
W. C. Coulies
Jno. C. MacGregor

Inventor
Calvin P. Shufelt
By Coburn & Thacher
Attorneys

UNITED STATES PATENT OFFICE.

CALVIN P. SHUFELT, OF SANDWICH, ILLINOIS, ASSIGNOR OF ONE-HALF TO J. PHELPS ADAMS AND HENRY A. ADAMS, BOTH OF SAME PLACE.

GRAIN-BINDER.

SPECIFICATION forming part of Letters Patent No. 265,159, dated September 26, 1882.

Application filed March 15, 1882. (No model.)

*To all whom it may concern:*

Be it known that I, CALVIN P. SHUFELT, a citizen of the United States, residing at Sandwich, in the county of De Kalb and State of Illinois, have invented certain new and useful Improvements in Grain-Binders, fully set forth in the following specification, reference being had to the accompanying drawings, in which—

Figure 1:
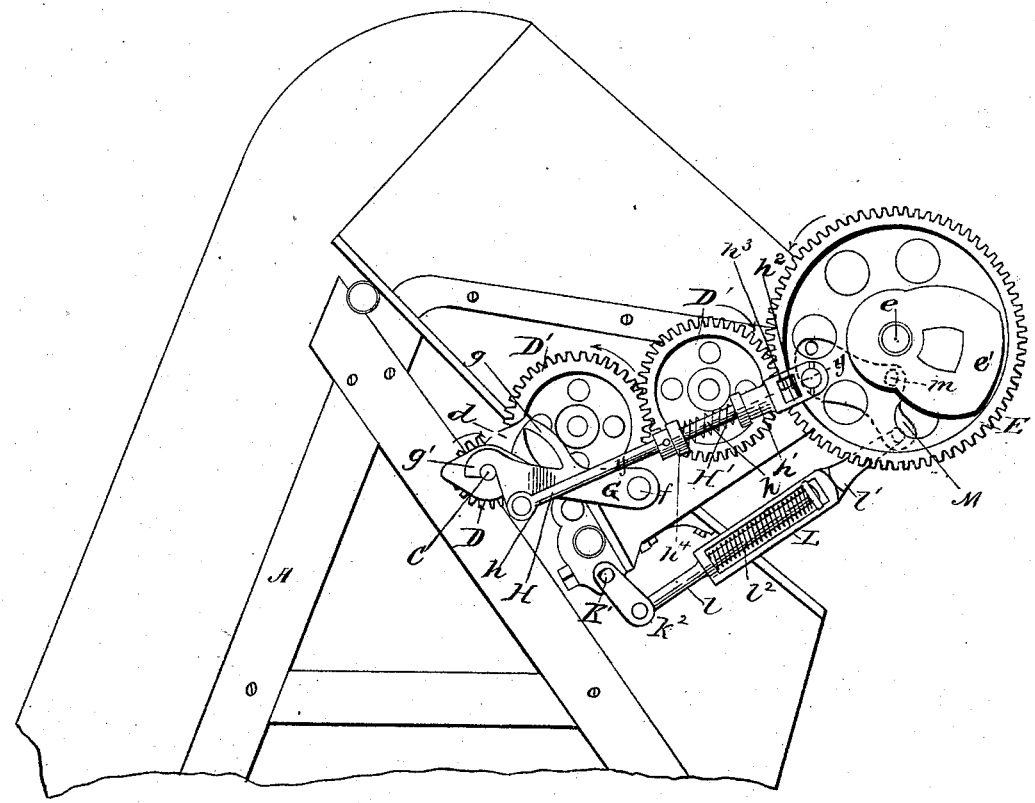
Figure 2:
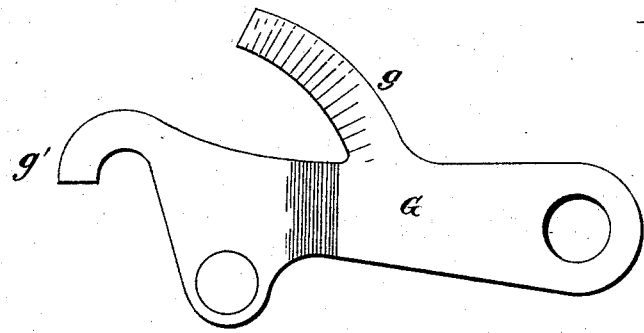
Figure 3:
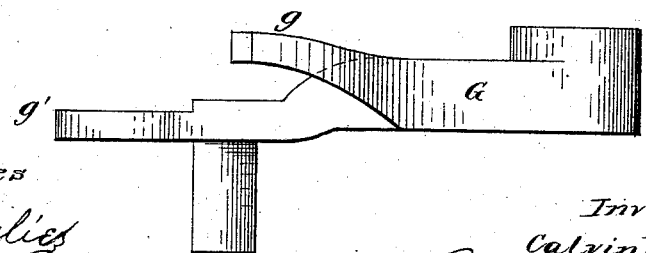
Figure 7:
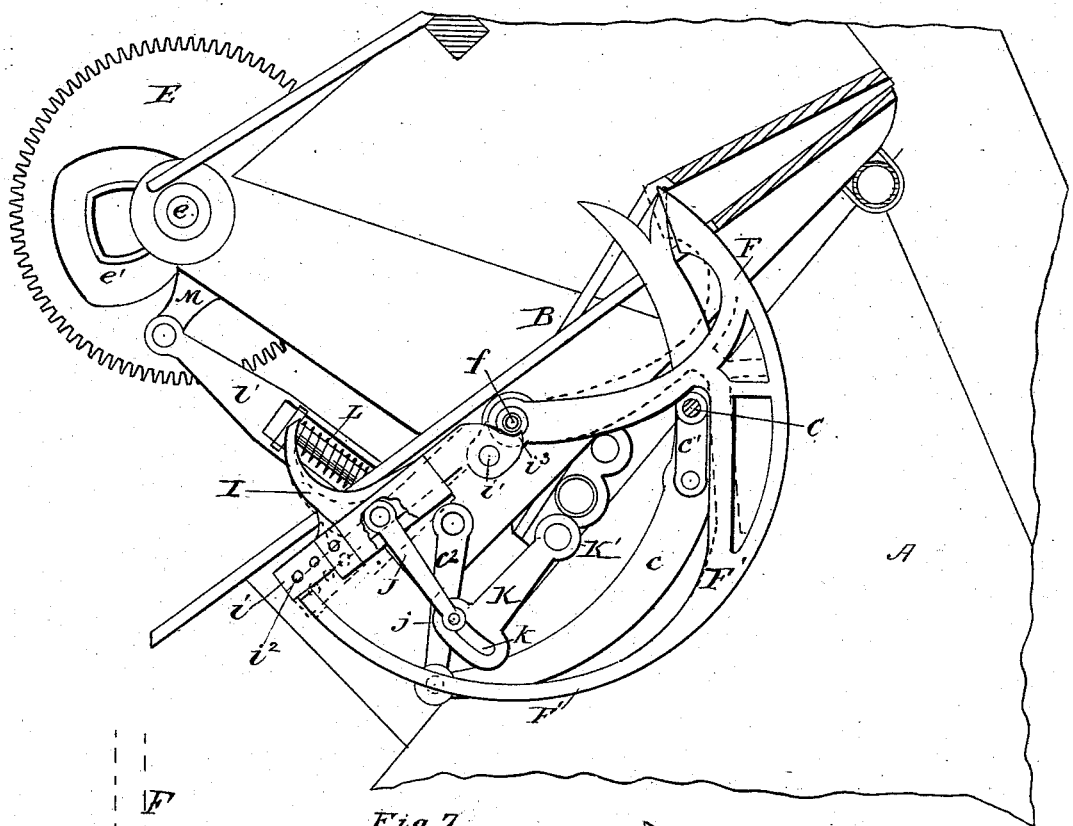
Figure 9:
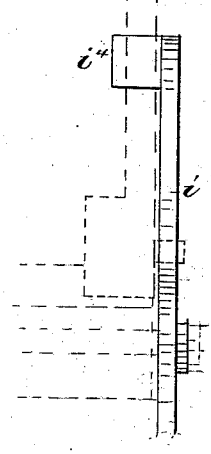
Figure 8:
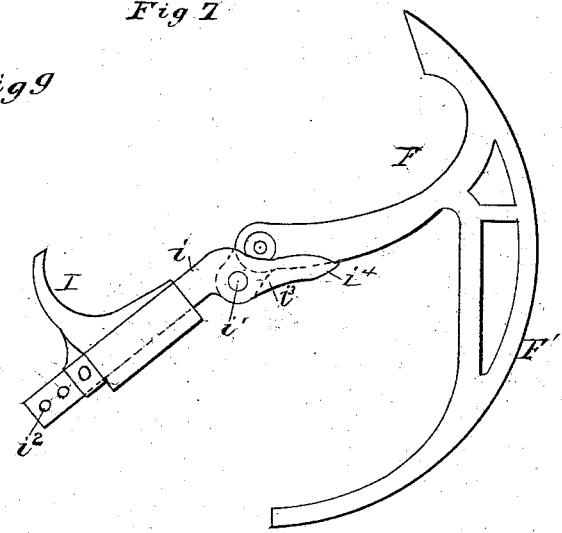

Figure 1 represents a rear end elevation of a grain-binder embodying my improvements; Fig. 2, an elevation on an enlarged scale of the stop-arm; Fig. 3, a plan view of the same on the same scale; Fig. 4, a plan view of the binder, a portion of the forward end being broken away, and on the same scale as Fig. 1; Fig. 5, a detail section of the jointed pitman, taken on the line $y\ y$, Fig. 1, and on an enlarged scale; Fig. 6, a detail sectional view of the same, taken on the line $z\ z$, Fig. 5; Fig. 7, a transverse section of the binder, taken on the line $x\ x$, Fig. 4, and on the same scale; Fig. 8, a detail elevation, showing a modification in the construction of the trip-lever; and Fig. 9, a plan view of a portion of the same on an enlarged scale.

My invention relates to that class of automatic grain-binders now generally known as the "Appleby binder," in which a clutch-shipping mechanism is employed, consisting of a clutch-arm and a stop-arm, for the purpose of shipping the clutch to disconnect the binding mechanism from the main gearing of the harvester; and the invention consists in improvements in the shipping mechanism and the compressing devices.

I will proceed to describe in detail such parts of the machine as are necessary to an understanding of the construction and operation of my invention as I have embodied it practically in one form, and will then point out definitely in the claims the particular improvements which I believe to be new and desire to protect by Letters Patent.

The main parts of a harvesting-machine with automatic binder attached are now well known, and hence I have not shown them in the drawings, and shall not describe them here, it being understood that the binder may be applied to any harvester the organization of which will permit the attachment.

The general construction of the Appleby binder is also now well known, and therefore I have not shown and shall not describe all the devices necessary to the construction of a working machine, but confine myself to those parts which are necessary to show clearly the construction, application, and operation of my improvements, it being understood that all the other parts necessary to the completion of a working machine are of any construction and organization adapted to the purpose.

In the drawings, A represents the elevator-frame of the machine, which in this instance is of the class adapted to elevate the grain over the main wheel, and B the receiver to which the grain is delivered.

The driving-shaft C is properly mounted in the frame and running to the rear of the machine. This shaft receives motion from the main gearing of the harvester by any proper means, and revolves continually unless thrown out of gear with the harvester-driving mechanism. The usual packing-arms, $c$, are mounted on cranks $c'$ on the shaft C, being hinged at their lower ends to swinging link-rods $c^2$. The usual driving-pinion, D, is mounted loosely on the rear end of this same shaft, just in rear of the elevator-frame, and is provided with clutch mechanism, by means of which it is connected to or disconnected from the shaft in a well-known way. I do not show in detail this mechanism, and shall not describe it, for the reason that it is well known and in general use on the binder heretofore mentioned. This pinion is provided with a spring clutch-arm, $d$, attached thereto on the outer side; and there is provided, further, the Appleby mechanism for clutching the pinion to its shaft.

The main gear-wheel E of the binding mechanism is mounted on a shaft, $e$, at the outer side of the binder, and in the usual way, and between it and the driving-pinion D are two transmitting-gears, D', by means of which motion is communicated from the latter to the former.

The binding-arm F is mounted on a rock-shaft, $f$, outside of the driving-shaft C, and extends to the rear end of the machine, parallel with the latter, being arranged, as usual, to drop below the receiver while the bundle is forming, and then be passed up around the bundle to place the string in the operation of binding. The binding-arm is provided with a branching curved arm, F', projecting out at its rear, which serves as a cut-off and guard during the operation of binding the bundle. This arm in some instances is extended so as to perform an additional function, as will presently be explained.

An arm, G, is fixed to the rear end of the binding-arm shaft, by means of which the latter is oscillated to give the necessary vibration to the binding-arm, these movements being effected by connecting this arm (which for this purpose acts as a crank-arm) to a crank-pin on the gear-wheel E by a pitman, H. The arm G extends inward from the rock shaft, as shown in Fig. 1 of the drawings, and is provided with a curved finger, $g$, projecting longitudinally upward and laterally inward from the body of the arm. This finger is of such shape and arrangement that when the arm is down in the position to hold the binding-arm open the end of the finger will stand in the path of the clutch-arm on the driving-pinion D as it is revolved with the latter, thereby stopping the rotation of the drive pinion by disconnecting it from the driving-shaft in the well-known way. At the extreme inner end of the arm G is a hook, $g'$, which is arranged to strike down and rest upon the end of the shaft C, thereby forming a rigid stop to prevent the stop-arm G being carried below a certain point under any circumstances. The pitman H is connected to a projection on the lower side of the arm, so that when the binder is in a state of rest while the bundle is being formed the tension on the pitman will tend to hold the stop-arm down in place. The relative positions of these devices during this interval are shown in Fig. 1 of the drawings.

Obviously the tension on the stop-arm just alluded to must be yielding, and I obtain this result by providing a longitudinal movement in the pitman itself by constructing the latter in a peculiar manner, which I will now proceed to describe.

The pitman is composed of two sections, $h$ $h'$, the former in the drawings being connected to the stop-arm G and the latter to the driving-gear E, though this arrangement is merely arbitrary. The section $h'$ is tubular and receives the outer portion of the section $h$. Back of an eye in the tubular portion is an opening, $h^2$, as shown in Fig. 5 of the drawings, within which works a nut, $h^3$, on the end of the section $h$. It will be seen that the two sections are thus connected together, and that the section $h$ is permitted to have a limited sliding movement in the other section lengthwise. The inner end of the section $h'$ is enlarged to form a collar, which is recessed to provide a seat for a spiral spring, H', placed around the section $h$, the other end of the spring being seated in a collar, $h^4$, fastened upon the section $h$, the collar being enlarged and recessed, like the end of the section $h'$. The natural force of this spring acts to hold the two sections of the pitman apart as far as possible; but obviously the movement of one section upon the other, mentioned above, is still possible, the spring yielding to permit this result. The force of the spring will tend to hold down the stop-arm in its stopping position; but under sufficient force the arm may evidently be raised to release the clutch-arm without starting the drive-wheel E, the spring yielding to permit a sufficient movement of the sliding section of the pitman for this purpose. The stop-arm is therefore held in position by an elastic pressure, which may be overcome by the application of suitable force.

The tension of the spring may be adjusted by moving the collar $h^4$, which is adjusted on its pitman-section, and is held in place by a set-screw. It will be seen from this description that my stop mechanism is connected directly to the driving-gear of the binder, but that I provide for the necessary movement of the stop-arm to trip the clutch-arm while this driving-gear is at rest. Now, as stated above, the stop-arm is fixed to the same rock-shaft which carries the binding-arm. If, then, a movement can be given to the binding-arm, independently of its ordinary operating mechanism, sufficiently to rock its shaft enough to throw up the stop-arm to disengage it from the clutch-arm $d$, the desired result will be obtained. This movement of the binding-arm may be obtained in several ways, it being necessary, however, whatever devices are employed for this purpose, to arrange them so as to be acted upon by the yielding trip against which the bundle is formed by the packers. In Fig. 7 of the drawings I have shown one style of mechanism for this purpose.

The usual trip, I, is mounted on an arm, $i$, which is pivoted, as usual, at its inner end to a pin, $i'$, connected to the binding-arm or binding-arm shaft. The trip is sleeved to its supporting-arm, so as to slide back and forth thereon, and in the latter are a series of holes, $i^2$, by means of which and corresponding holes in the trip and a suitable pin the latter may be adjusted back and forth on the arm.

As already stated, the binding-arm is provided with a branching curved arm, F', and in this instance the latter arm is extended, so that when the binding-arm is open and all the parts of the machine just ready to receive the grain for the bundle the outer end of the extension will rest directly under the free end of the supporting-arm $i$ and in contact therewith, as shown in Fig. 7 of the drawings. Obviously, then, as the bundle is formed against the trip by the well-known action of the packers, and the trip yields, as usual, under this action, the arm $i$ is gradually depressed, thereby pressing upon the extension of the binding-arm and lifting the latter, and thus rocking its shaft, as shown in dotted lines in Fig. 7. As this operation is continued the clutch-arm will finally be tripped by the lifting of the stop-arm G, as explained above, and the binding mechanism will be thrown into gear. It will be noticed that the trip is practically rigid on its supporting-arm, though adjustable back and forth thereon, and that the supporting-arm $i$ is held up when the binding-arm is open by the end of the extension of the latter. The trip-supporting arm at its inner or pivoted end is extended beyond its pivot somewhat underneath the shaft on which the binding-arm is mounted, being curved downward somewhat to make a slightly hook-shaped extension, $i^3$, as shown in Fig. 7 of the drawings. This projection permits the supporting-arm to be depressed sufficiently to trip the clutch mechanism, as described, but, coming in contact with the shaft above, prevents said arm from falling below a certain point.

A connecting-rod, J, is hinged at its upper end to the supporting-arm $i$, from which it depends, and is connected at its lower end to an arm, K, by means of a pin, $j$, entering a slot, $k$, in the outer end of the arm K. This arm K is attached at its inner end to a rock-shaft, K', which is arranged below the binding-arm shaft and extends to the rear end of the machine, and at its rear end is provided with a crank-arm, $k^2$.

A pitman, L, is connected at its lower end to the crank-arm $k^2$, at its upper end being connected to a swing-block, M, pivoted at one end to the binder-frame, just inside of the driving-wheel E, the attachment thereto of the pitman L being at the other end of the block. This is an elastic pitman of ordinary construction, being composed of two parts, $l\ l'$, one of which is sleeved in the other, and surrounded by a spiral spring, $l^2$, inside of the sleeve, the spring being held in place by a nut on the end of the section, as shown in Fig. 1 of the drawings.

The pivoted block M is provided with a pin, $m$, on the side next the gear-wheel, and located on said block between the pitman attachment and the pivot of the block. This pin projects into a cam-groove, $e'$, on the inner face of the wheel E, as shown in Figs. 1 and 7 of the drawings, the groove being of such shape as to swing the block in certain directions as the wheel E is rotated, and thereby rock the shaft K' to give certain movements to the trip-supporting arm, as will be hereinafter described.

In Fig. 8 of the drawings I have shown other means for giving the independent vibration to the binding-arm. In this device the heel-extension $i^3$ of the trip-supporting arm is extended much farther under the binder-arm shaft than described above, and is provided with a lip, $i^4$, extending directly underneath the binding-arm and in contact therewith, as shown in Fig. 8 of the drawings. Obviously, then, as the outer end of the trip-supporting arm is depressed under the action of the packers, the heel-extension will operate as a lever to throw up the binding-arm sufficiently to raise the stop-arm. With this device the cut-off extension of the binder-arm is only of ordinary length; but in all other respects the devices are constructed the same as described above.

I have not shown the devices for holding and tying the cord, as they constitute no part of this invention and may be of any suitable construction for use in this type of machine.

The operation of my improvements is as follows: The binding-arm being open, the several parts are in position, as shown in Figs. 1 and 7 of the drawings. The driving-pinion being held out of engagement with its shaft by the stop-arm, and the latter held down in place by a yielding force, the grain is received in the usual way, and under the well-known operation of the packers the bundle is gradually formed against the trip I. The relative positions of the parts at the commencement of this operation are shown in Figs. 1 and 7 of the drawings. As the bundle is formed the supporting-arm of the trip is gradually depressed, thereby moving the binding-arm little by little, and so turning its shaft and gradually raising the stop-arm until at last it is disengaged from the clutch-arm, when, under the operation of a spring attached to the latter, the driving-pinion is immediately clutched to its shaft and the binding mechanism thereby set in operation. During the formation of the bundle it is obvious that the connecting-rod J will be gradually moved downward by the depression of the trip-support; but at this time the wheel E and consequently the rock-shaft K' are stationary, and in order to permit this depression of the rod J the slot $k$ is provided in the arm K, in which the pin at the lower end of the rod J moves downward without affecting the arm K. When the bundle is formed and the trip is operated the pin is at the bottom of the slot, in which position it remains until the bundle is compressed and the knot tied, for the cam-groove in the wheel E is so formed that during the first part of the revolution of the wheel the swinging block M will not be moved, and hence the rock-shaft K' and arm K will remain at rest. As the wheel E begins to revolve and the binding-arm closes the compression of the bundle takes place, and if, during this operation, the size of the bundle requires some yielding of the parts, it is effected by the yielding of the arm K to the pressure of the pin in the bottom of the slot $k$, this yielding of the arm being permitted by the elastic pitman connecting the rock-shaft K' to the swinging block. The tying of the knot then takes place, and then the cam-groove in the wheel E swings the block so as to throw down the arm K, thereby permitting the trip to drop for the discharge of the bound bundle. After the tying is accomplished the binding-arm is opened at the proper time, and the stop-arm G at the same time is thrown down into position to throw the clutch of the pinion D out of operation, and at the same time the cam on the wheel E throws the swinging block so as to quickly depress the arm K, and thereby the trip also, to facilitate the discharge of the bundle. At the close of the revolution of the wheel E, and during the latter part of the rotation of this wheel, the cam thereon operates to throw up the arm K. As the binding-arm is operated to bring the parts back into the position shown in Fig. 7 of the drawings, the stop-arm G having been brought into position for operation on the clutch-arm, the binding mechanism is thrown out of gear and comes to a state of rest, in position to receive and form another bundle. It will be understood, of course, that the entire operation of binding a bundle and bringing the parts back into position to receive and form another is performed by one revolution of the wheel E.

In some details of construction the devices here described and shown may be modified without changing the main features of my invention.

It will be seen that with my improvements the clutch mechanism is operated by the movement of the binding-arm, instead of being a mechanism separate and distinct from the binding-arm and its shaft and operated independently of the latter. I have thus simplified the mechanism, insured certainty of operation, and at the same time have obviated a difficulty sometimes arising in the independent clutch mechanisms from their being actuated or held open by unseparated bundles of tangled grain. In my mechanism the discharge of the bundle cannot produce this result, as it is brought positively back into the required position by the movement of the binding arm and its shaft. I also obviate the depression of the trip-supporting arm below its proper working-point, which sometimes occurs in the independent trip mechanism, so as to lock the parts and completely stop their return movement.

It will be understood, of course, that the bundles are sized in this mechanism by the operation of the trip, and I change the size of the bundles by adjusting the trip on its supporting-arm by sliding it in and out thereon, and fixing it in the required position by means of pins passing through the holes. The stiffness of the yielding compressing mechanism is adjusted by regulating the tension of the spring on the pitman L, and the compactness of the bundles formed by the packers is regulated by adjusting the tension of the spring in the pitman H, as will be readily understood.

Having thus described my invention, what I claim as new, and desire to secure by Letters Patent, is—

1. In a grain-binder, a clutch-shipping mechanism, in combination with the binding-arm, with which it is connected in such manner that the movement of the binding-arm in the direction of closing will operate the shipping mechanism to throw the binding mechanism into gear with its motor, substantially as and for the purposes set forth.

2. The binding-arm, in combination with a clutch-shipping mechanism connected therewith, the main gear-wheel of the binder, and a yielding pitman connecting the latter to the shipping mechanism, whereby the binding-arm is permitted to move to a limited extent without moving its main motor, substantially as and for the purposes set forth.

3. The binding-arm, in combination with the rock-shaft to which it is attached, a stop arm attached to the same shaft, and a clutch-arm attached to the driving-pinion, substantially as and for the purposes set forth.

4. The driving-pinion D, provided with the spring clutch-arm $d$, in combination with the stop arm G, provided with the curved finger $g$, the rock-shaft $f$, and the binding-arm F, substantially as described.

5. The binding-arm, in combination with a stop-arm connected therewith, the main gear-wheel of the binder, an elastic pitman connecting the latter to the stop-arm, whereby the binding-arm is permitted to move to some extent without rotating the gear-wheel, and a mechanism for moving the binding-arm to a limited extent independently of the main driving-gear of the binder, substantially as and for the purposes set forth.

6. The driving-pinion provided with the clutch-arm, in combination with the stop-arm G, the main gear E, and the elastic pitman H, connected to the stop-arm at a point below the center of motion of said arm, substantially as and for the purposes set forth.

7. The stop-arm G, provided with the curved stop-finger $g$ and the curve or hook $g'$, substantially as described.

8. The main shaft C, in combination with the stop-arm G, the free end of which is adapted to rest on said shaft when in operative position, the main gear E, and the elastic pitman H, substantially as and for the purposes set forth.

9. The binding-arm, in combination with a yielding trip, against which the bundle is formed, and mechanism operated by the yielding of said trip to move the binding-arm, whereby said binding-arm may be moved to a limited extent during the operation of forming the bundle independently of the ordinary driving mechanism of the binder, substantially as and for the purposes set forth.

10. A yielding trip against which the bundle is formed, in combination with the binding-arm, and a curved arm projecting from the back of the latter and extended around so as to be brought in contact with the trip-support when the binding-arm is open, substantially as described.

11. The trip, I in combination with the pivoted supporting-arm on which it is mounted, the binding-arm F, and the curved arm F', projecting from the rear of the latter and extended so as to come in contact with the arm $i$ when the binding-arm is open, substantially as and for the purposes set forth.

12. The binding-arm F, mounted on the rock-shaft $f$, in combination with the stop-arm G, mounted fast on the same rock-shaft, the trip I, the pivoted supporting-arm $i$, and the curved arm F', projecting from the rear of the binding-arm, all constructed and operating substantially as described.

13. The trip I, in combination with its pivoted supporting-arm $i$, provided with a heel-extension, $i^3$, and the rock-shaft of the binding-arm, substantially as described.

14. The trip-supporting arm $i$, in combination with the rod J, and the vibrating arm K, provided with the slot $k$, substantially as and for the purposes set forth.

15. The trip-supporting arm $i$, connected to the rock-shaft of the binding-arm at one side thereof, in combination with the connecting-rod J, slotted arm K, rock-shaft K', and yielding pitman L, connected to the main gear-wheel E, substantially as and for the purposes set forth.

16. The trip-supporting arm $i$, connected to the rock-shaft of the binding-arm, in combination with the connecting-rod J, slotted arm K, rock-shaft K', yielding pitman L, pivoted block M, and main gear E, provided with the cam-groove $e'$, all constructed and operating substantially as described.

17. The pitman H, composed of the sections $h\ h'$, and the spring H', all constructed substantially as described, in combination with the main gear-wheel E, and the stop-arm G, attached to the rock-shaft of the binding-arm, substantially as and for the purposes set forth.

CALVIN P. SHUFELT.

Witnesses:
S. B. STINSON,
J. P. ADAMS.